United States Patent
Nacer et al.

(10) Patent No.: US 11,503,654 B2
(45) Date of Patent: *Nov. 15, 2022

(54) CONNECTING TO A PACKET DATA NETWORK (PDN) BASED ON PRIORITY

(71) Applicant: Verizon Patent and Licensing Inc., Basking Ridge, NJ (US)

(72) Inventors: Jeremy Nacer, Denville, NJ (US); Nanjun Qian, Princeton, NJ (US); Stephane Chaysinh, Basking Ridge, NJ (US); David G. Greiner, New Hyde Park, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/948,982

(22) Filed: Oct. 8, 2020

(65) Prior Publication Data

US 2021/0045166 A1 Feb. 11, 2021

Related U.S. Application Data

(63) Continuation of application No. 16/205,022, filed on Nov. 29, 2018, now Pat. No. 10,820,357.

(51) Int. Cl.
*H04W 76/10* (2018.01)
*H04W 72/10* (2009.01)
*H04W 88/16* (2009.01)

(52) U.S. Cl.
CPC .......... *H04W 76/10* (2018.02); *H04W 72/10* (2013.01); *H04W 88/16* (2013.01)

(58) Field of Classification Search
CPC ..... H04W 76/10; H04W 72/10; H04W 88/16; H04W 36/0033; H04W 36/0061; H04W 36/08; H04W 8/082; H04W 12/06; H04W 36/18; H04W 36/32; H04W 36/38; H04W 36/12; H04W 60/04; H04W 12/0602
See application file for complete search history.

(56) References Cited

U.S. PATENT DOCUMENTS

2018/0167854 A1* 6/2018 Enomoto .......... H04W 36/0033
2018/0270741 A1 9/2018 Enomoto et al.

* cited by examiner

*Primary Examiner* — Dady Chery

(57) ABSTRACT

A serving gateway device (SGW) can cause establishment of a requested connection to a first PDN for a user device. The SGW can cause suspension of the connection to the first PDN and establishment of a requested connection to a second PDN for the user device based on a requested connection to a second PDN for a user device. The SGW can cause termination of the connection to the second PDN based on the respective end time associated with the second PDN, and cause restoration of the connection to the first PDN after the connection to the second PDN is terminated.

20 Claims, 14 Drawing Sheets

CONNECTING TO A PACKET DATA NETWORK (PDN) BASED ON PRIORITY

RELATED APPLICATION

This application is a continuation of U.S. patent application Ser. No. 16/205,022, entitled "CONNECTING TO A PACKET DATA NETWORK (PDN) BASED ON PRIORITY," filed Nov. 29, 2018 (now U.S. Pat. No. 10,820,357), which is incorporated herein by reference.

BACKGROUND

A packet data network (PDN) provides data services for devices connected to the PDN. In some cases, a device can access a plurality of packet data networks (PDNs) at the same time.

DETAILED DESCRIPTION OF PREFERRED EMBODIMENTS

Figure 1A:
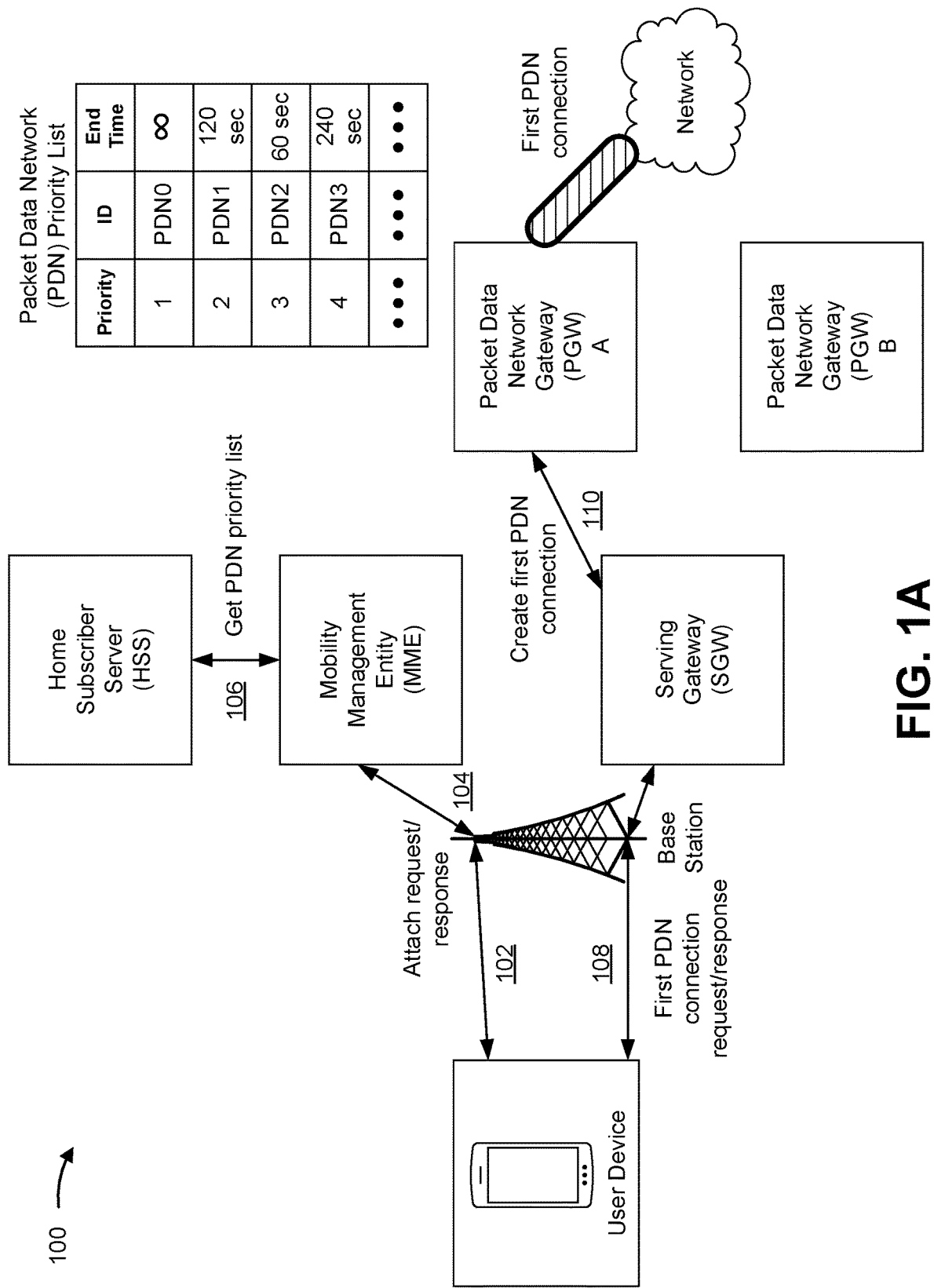
FIGS. 1A-1I are diagrams of an example implementation described herein.

The following detailed description of example implementations refers to the accompanying drawings. The same reference numbers in different drawings can identify the same or similar elements.

In some instances, a user device communicates with multiple packet data networks (PDNs) in order to operate and/or provide a service. Some user devices are able to connect to multiple PDNs at the same time. However, some user devices, such as narrowband Internet of Things (NB-IoT) devices, are able to connect to only one PDN at a time (e.g., "single-PDN user devices"). In some instances, a single-PDN user device needs to access multiple PDNs, but has no mechanism for determining when to connect to a particular PDN instead of another PDN. Moreover, the single-PDN user device cannot prioritize the particular PDN over other PDNs, even if connecting to the particular PDN is more important than connecting to the other PDNs.

Some implementations described herein provide a serving gateway device (SGW) device that is capable of connecting a user device to a PDN based on priority. In some implementations, the user device can obtain a PDN priority list that identifies, for each PDN of a plurality of PDNs, a respective priority and a respective time limit (e.g., an end time, a run time, a time limit, a run until idle time, and/or the like). According to some implementations, the user device can send a first request to create a connection to a first PDN to the SGW, which can cause establishment of the connection to the first PDN. In some implementations, the user device can receive a message indicating that user device should connect to a second PDN. In some implementations, the user device can determine that the respective priority of the second PDN is higher than the respective priority of the first PDN and then can send a second request to create a connection to the second PDN to the SGW. In some implementations, the SGW can cause suspension of the connection to the first PDN and cause establishment of the connection to the second PDN. In some implementations, the SGW can cause termination of the connection to the second PDN based on the respective time limit associated with the second PDN and cause restoration of the connection to the first PDN.

In this way, some implementations can facilitate establishment, suspension, and/or termination of a connection to a PDN for a user device based on a PDN priority list that is tailored to the specific needs of the user device, network components, and/or the like, which can result in increased quality of service for a user of the user device, more efficient management of network resources, and/or the like. In addition, some implementations facilitate establishment, suspension, and/or termination of connections to hundreds, thousands, millions, or more PDNs for hundreds, thousands, millions, or more user devices at the same time. This can improve speed and efficiency of the user device and conserve computing resources (e.g., processor resources, memory resources, and/or the like) of the user device and/or the network components that would otherwise be used to unnecessarily create and terminate connections to PDNs.

FIGS. 1A-1I are diagrams of an example implementation 100 described herein. Example implementation 100 illustrates various portions of a wireless telecommunications system, which in some implementations can be a long term evolution (LTE) wireless telecommunications system. Example implementation 100 can be a 3G wireless telecommunications system, a 4G wireless telecommunications system, an LTE-Advanced (LTE-A) wireless telecommunications system, a 5G wireless telecommunications system, and/or the like.

As shown in FIGS. 1A-1I, example implementation 100 can include a user device wirelessly connected to a radio access network (RAN) at a base station, which is connected to a data network via a core network. The user device can run an application that requires communicating with the data network and, therefore, the user device can enter into a communications session with the data network via the RAN, core network, and a packet data network (PDN) connection. The user device and the core network can communicate application-specific data during the communications session via the PDN connection.

The user device of example implementation 100 can be a communication and/or computing device, such as a mobile phone, a smartphone, a laptop computer, a tablet computer, an Internet of Things (IoT) device (e.g., a narrowband Internet of Things (NB-IoT) device), and/or the like. In some implementations, one or more processors of the user device can facilitate the communications session with the data network via the PDN connection. In some implementations, the user device can communicate with a Short Message Service Center (SMSC) (e.g. a network element) that can facilitate delivery of short message service (SMS) messages to the user device to initiate a connection to a PDN.

In some implementations, a PDN can be configured to carry a particular type of traffic. For example, a PDN can be configured to carry IP Multimedia Subsystem (IMS) traffic (e.g., voice and text traffic), network administration traffic (e.g., subscriber identification module (SIM) and/or firmware management traffic), internet traffic, private network traffic, and/or the like.

The base station of example implementation 100 can include an access point of a RAN, such as an LTE evolved NodeB (eNodeB or eNB), a 5G next generation NodeB (gNodeB or gNB), and/or the like. In some implementations, the base station facilitates the communications session by communicating the application-specific data between the user device and the core network. The core network of example implementation 100 can include various types of telecommunications core networks, such as an LTE evolved packet core (EPC), a 5G next generation core network (NGC), and/or the like.

In some implementations, the core network can include a mobility management entity (MME), a serving gateway (SGW), and/or one or more packet data network gateways (PGWs), as well as other components and functions. In some implementations, the SGW can control a PGW of the one or more PGWs to establish a PDN connection through the PGW. In some implementations, the MME can communicate with a home subscriber server (HSS) to obtain PDN-related information, such as a PDN priority list, and send the PDN-related information to the user device. In some implementations, the MME, the SGW, the one or more PGWs, the HSS, as well as the other components and functions, can be located at the same location or cannot be collocated (e.g., each component and/or function of the core network can be at a different location from each other component and/or function of the core network).

In some implementations, the data network of example implementation 100 can include various types of data networks, such as the interne, a third party services network, an operator services network, a private network, a wide area network, and/or the like.

As shown in FIG. 1A, the user device can obtain (e.g., receive, fetch, and/or the like), from the HSS, the PDN priority list. In some implementations, the PDN priority list can list a plurality of PDNs. In some implementations, the PDN priority list can identify, for each PDN of the plurality of PDNs, a respective priority and/or a respective time limit (e.g., an end time, a run time, a time limit, a run until idle time, and/or the like). For example, as shown in FIG. 1A, the PDN priority list identifies a plurality of PDNs (e.g., PDN0 to PDN3), and a respective "priority" and a respective "end time" for each PDN of the plurality of PDNs (e.g., PDN0 has a priority of 1 and an end time of ∞, which can indicate an infinite or unlimited amount of run time, PDN1 has a priority of 2 and an end time of 120 seconds, etc.). In some implementations, the respective priority can indicate a preference level for a PDN in comparison with other PDNs in the PDN priority list. For example, as shown in FIG. 1A, PDN0 has a priority of 1, which in this example, indicates a greater preference for PDN0 as compared to other PDNs in the PDN priority list. As another example, PDN2 has a priority of 3, which, in this example, indicates a greater preference for PDN2 as compared to PDN3 (with a priority of 4), but a lesser preference for PDN2 as compared to PDN0 (with a priority of 1) and PDN1 (with a priority of 2). In some implementations, the respective time limit associated with a PDN can indicate an amount of time to wait to end a connection to the PDN after the connection to the PDN goes idle. For example, as shown in FIG. 1A, PDN3 has a time limit of 60 seconds, which indicates that the SGW will wait for 60 seconds after the connection to PDN3 goes idle before ending the connection. As another example, PDN0 has a time limit of ∞, which indicates that the SGW will not automatically end the connection to PDN0, regardless of whether the connection to PDN0 goes idle.

In some implementations, the HSS can generate and/or determine the PDN priority list. In some implementations, the HSS can generate and/or determine the PDN priority list based on a type of the user device. For example, the HSS can generate and/or determine the PDN list based on whether the user device is a mobile device or an IoT device. In some implementations, the HSS can generate and/or determine the PDN priority list based on the user device. For example, the HSS can generate and/or determine the PDN list based on an identifier (e.g., an identification string, an IP address, a serial number, and/or the like of the user device) associated with the user device. In some implementations, the HSS can generate and/or determine the PDN priority list based on a demand (e.g., a workload, a usage amount, a stress level, and/or the like) of the MME, the SGW, the one or more PGWs, and/or the like. In some implementations, the HSS can generate and/or determine a PDN priority list that is used for all user devices. In some implementations, the PDN priority list is dynamic and/or the HSS can update the PDN priority list periodically. In some implementations, the PDN priority is static for a period of time and/or the HSS cannot update the PDN priority list for the period of time. In some implementations, the HSS can send the PDN priority list to the MME and/or the user device. In some implementations, the HSS can send the PDN priority list to the user device via the MME and/or the base station. In some implementations, the user device can obtain (e.g., receive, fetch, and/or the like) the PDN priority list from the HSS via the MME and/or the base station.

As shown by reference number 102, the user device can send an attach request (e.g., a request for the PDN priority list) to the base station, which can send an attach response (e.g., a response indicating that the base station will pass the attach request to the core network) to the user device. As shown by reference number 104, the base station can send the attach request to the MME. As shown by reference number 106, the MME, based on the attach request, can send a get PDN priority list signal to the HSS to request the PDN priority list for the user device. Based on the get PDN priority list signal, the HSS can send the PDN priority list to the user device via the MME and/or the base station.

As shown by reference number 108, the user device can send a first PDN connection request (e.g., a request for a connection to a PDN) to the base station, which can send a first PDN connection response (e.g., a response indicating that the base station will send the first PDN connection request to the core network) to the user device. The first PDN connection request can be a request for the SGW to create, for the user device, a connection to a first PDN. In some implementations, the first PDN connection request can identify the first PDN and can include, based on the PDN priority list, a respective priority and a respective time limit (e.g., an end time, a run time, a time limit, a run until idle time, and/or the like) for the first PDN. In some implementations, the user device can send the first PDN connection request to the SGW via the base station. For example, the user device can run an application that causes the user device to generate and send the first PDN connection request to the SGW via the base station. In some implementations, the SGW can obtain (e.g., receive, fetch, and/or the like) the first PDN connection request from the user device via the base station.

As shown by reference number 110, the SGW can cause, based on the first PDN connection request, establishment of the connection to the first PDN via a first PGW (shown in FIG. 1A as PGW A). For example, the SGW, based on the first PDN connection request, can establish a first bearer with the first PGW and send a first instruction signal to the first PGW via the first bearer to establish the connection to the first PDN. The first PGW, based on the first instruction signal, can establish the connection to the first PDN.

Figure 1B:
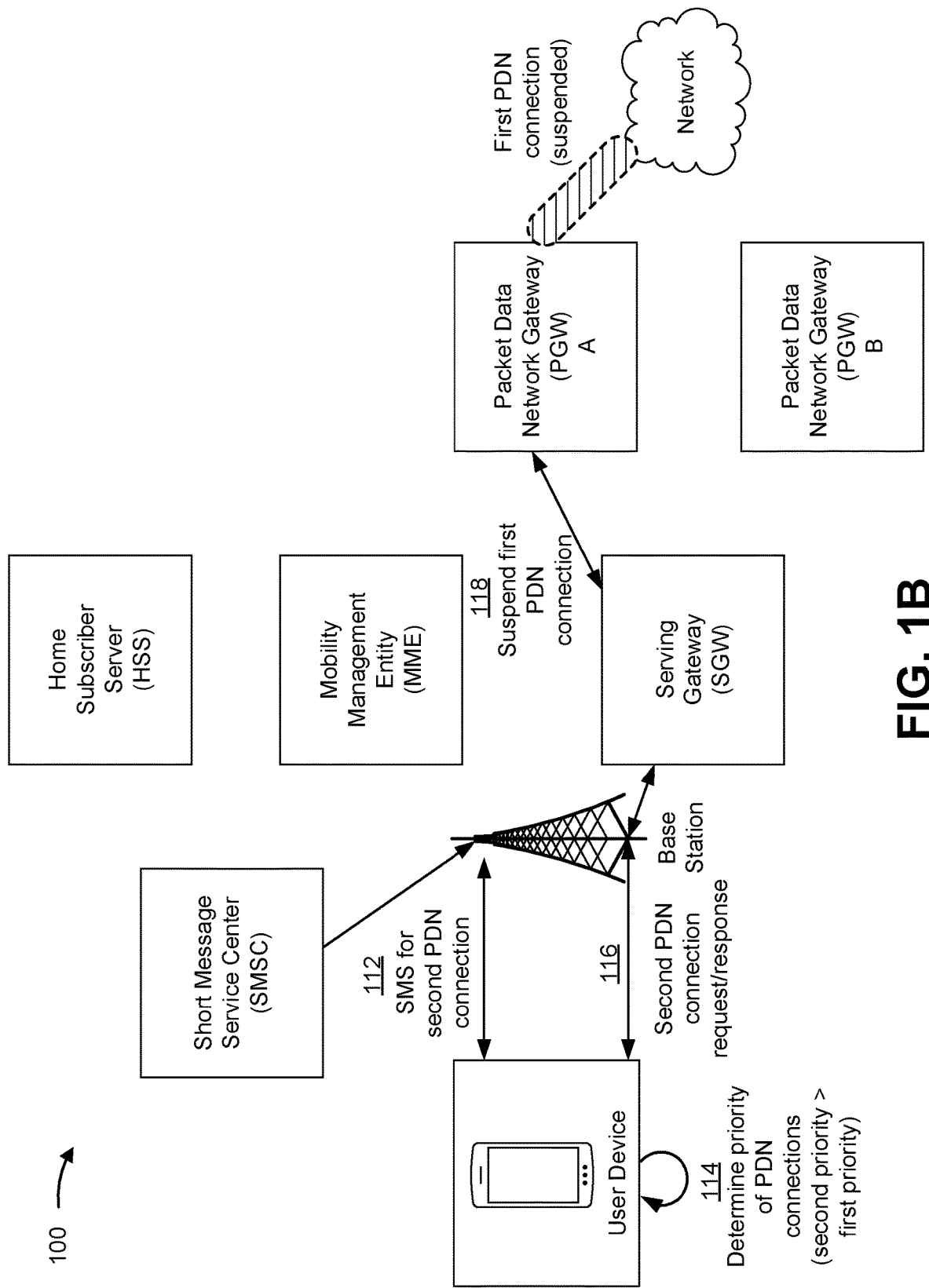

As shown in FIG. 1B and by reference number 112, the SMSC can send, to the user device and via the base station, a first SMS to initiate a connection to a second PDN. For example, the SMSC can send a first SMS that indicates that the user device needs to connect to a second PDN (e.g., an administrative PDN) for the user device to download updated firmware for controlling the user device. In some implementations, the user device can run one or more internal processes, such as an application, a web browser, an update request, a mobile originated (MO) call, and/or the like, that indicates to the user device, such as via a message, that the user device needs to connect to the second PDN.

As shown by reference number 114, the user device can determine, based on the PDN priority list, the priority of the second PDN. In some implementations, the user device can determine the respective priority of each PDN of the plurality of PDNs in the PDN priority list. In some implementations, the user device can determine, based on the priority list, that the priority of the second PDN is higher than the priority of the first PDN. For example, where the first PDN is PDN3 with a priority of 4 and the second PDN is PDN2 with a priority of 3, as shown in FIG. 1A, the user device can determine that the priority of the second PDN is higher than the priority of the first PDN (e.g., PDN2 with a priority of 3 has higher priority than PDN3 with a priority of 4, where 1 is the highest priority in this example). In some implementations, the user device, based on determining that the priority of the second PDN is higher than the priority of the first PDN, can determine that the first PDN connection should be paused to allow establishment of the second PDN connection.

As shown by reference number 116, based on the first SMS and/or determining that the priority of the second PDN is higher than the priority of the first PDN, the user device can send a second PDN connection request to the base station, which can send a second PDN connection response to the user device. The second PDN request can be a request for the SGW to create, for the user device, a connection to the second PDN. In some implementations, the second PDN connection request can identify the second PDN and can include, based on the PDN priority list, a respective priority and a respective time limit (e.g., an end time, a run time, a time limit, a run until idle time, and/or the like) for the second PDN. In some implementations, the user device can send the second PDN connection request to the SGW via the base station. In some implementations, the SGW can obtain (e.g., receive, fetch, and/or the like) the second PDN connection request from the user device via the base station.

As shown by reference number 118, the SGW can cause, based on the second PDN connection request, suspension of the connection to the first PDN. In some implementations, the SGW can cause the first PGW to suspend the connection to the first PDN. For example, the SGW, based on the second PDN connection request, can send a suspension signal to the first PGW (shown in FIG. 1B as PGW A) via the first bearer to suspend the connection to the first PDN. The first PGW, based on the suspension signal, can suspend the connection to the first PDN. In some implementations, the SGW can store information regarding the connection to the first PDN (e.g., the name of the first PDN, the priority of the first PDN, the time limit of the PDN, and/or the like) in a data structure, such as a database, to facilitate restoration of the connection to the first PDN at a later time.

Figure 1C:
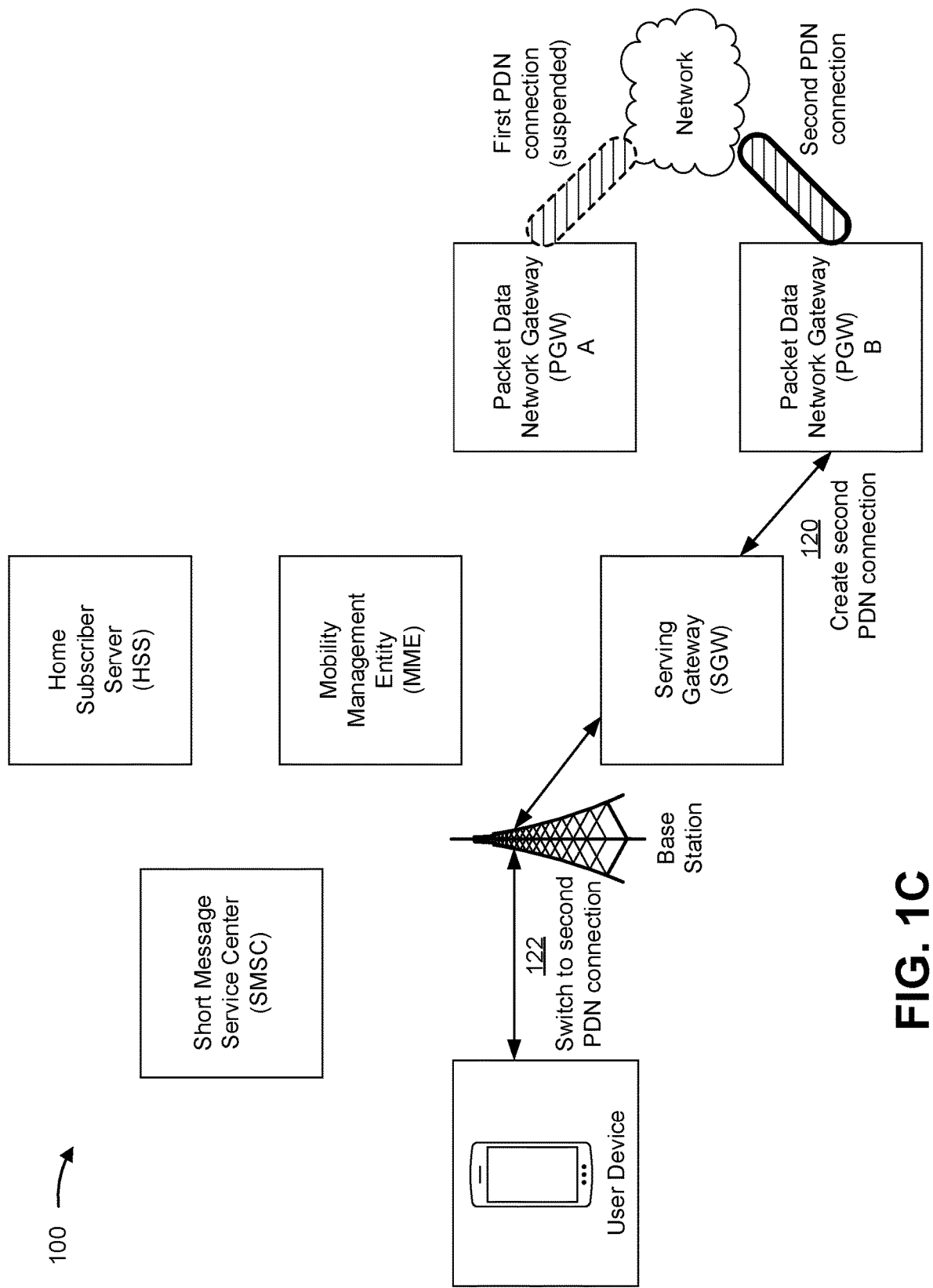

As shown in FIG. 1C and by reference number 120, the SGW can cause, based on the second PDN connection request and after causing suspension of the connection to the first PDN, establishment of the connection to the second PDN. In some implementations, the SGW can cause a second PGW (shown in FIG. 1C as PGW B) to establish the connection to the second PDN. For example, the SGW, based on the second PDN connection request, can establish a second bearer with the second PGW and send a second instruction signal to the second PGW via the second bearer to establish the connection to the second PDN. The second PGW, based on the second instruction signal, can establish the connection to the second PDN. As shown by reference number 122, the SGW can send a notification to the user device, via the base station, that indicates that the second PDN connection is established and/or that the user device should communicate via the second PDN connection. In some implementations, the user device can switch to the second PDN connection to communicate data with the data network via the core network.

Figure 1D:
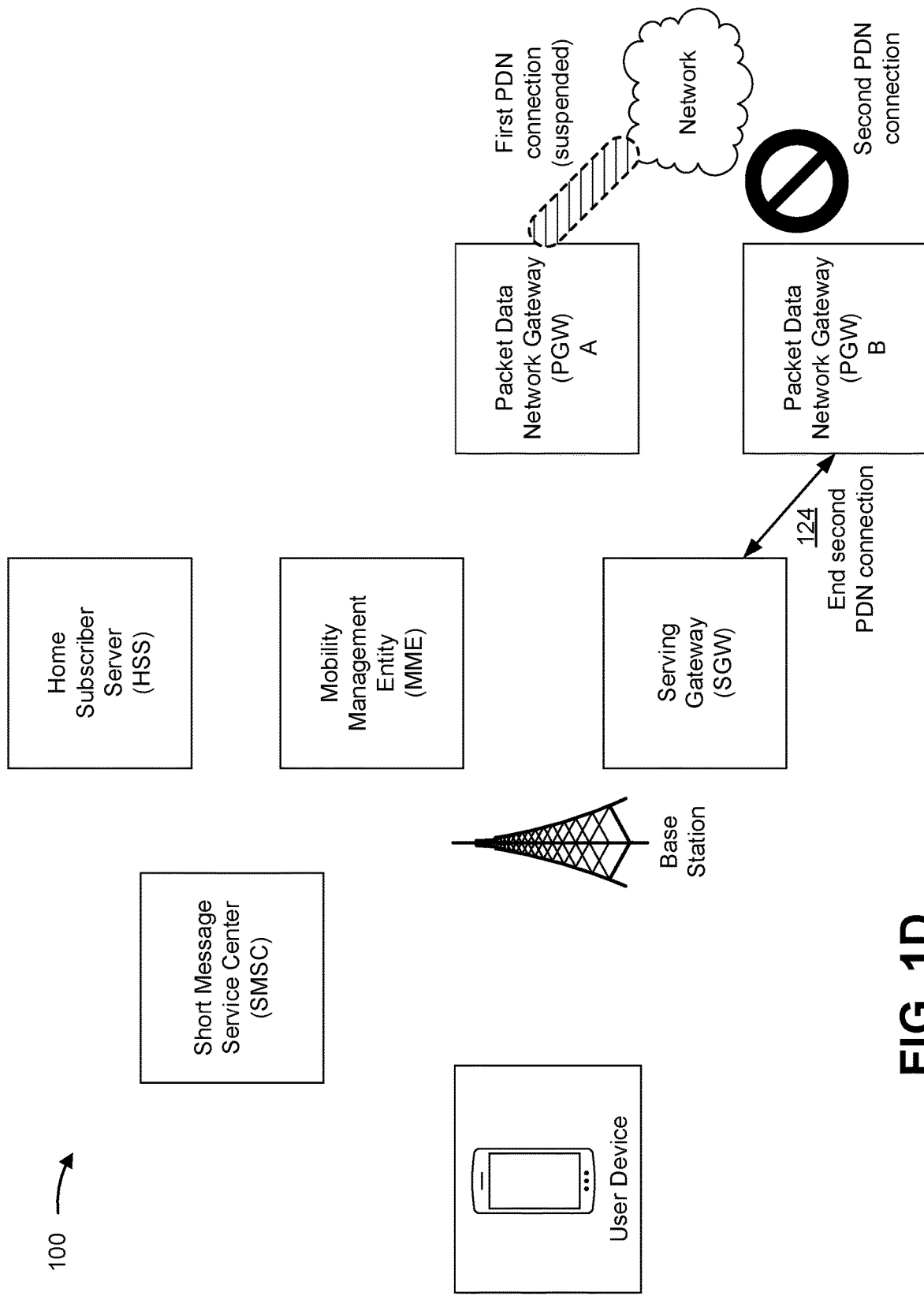

As shown in FIG. 1D and by reference number 124, the SGW can cause termination of the connection to the second PDN. In some implementations, the SGW can cause termination of the connection to the second PDN based on the time limit associated with the second PDN. For example, where the second PDN is PDN1 with a time limit of 120 seconds, as shown in FIG. 1A, the SGW can end the connection to the second PDN after the connection to the second PDN goes idle for 120 seconds. For example, the SGW, after determining that the second PDN connection has gone idle for a period of 120 seconds, can send a termination signal to the second PGW (shown in FIG. 1D as PGW B) via the second bearer to terminate the connection to the second PDN. The second PGW, based on the termination signal, can terminate the connection to the second PDN.

Figure 1E:
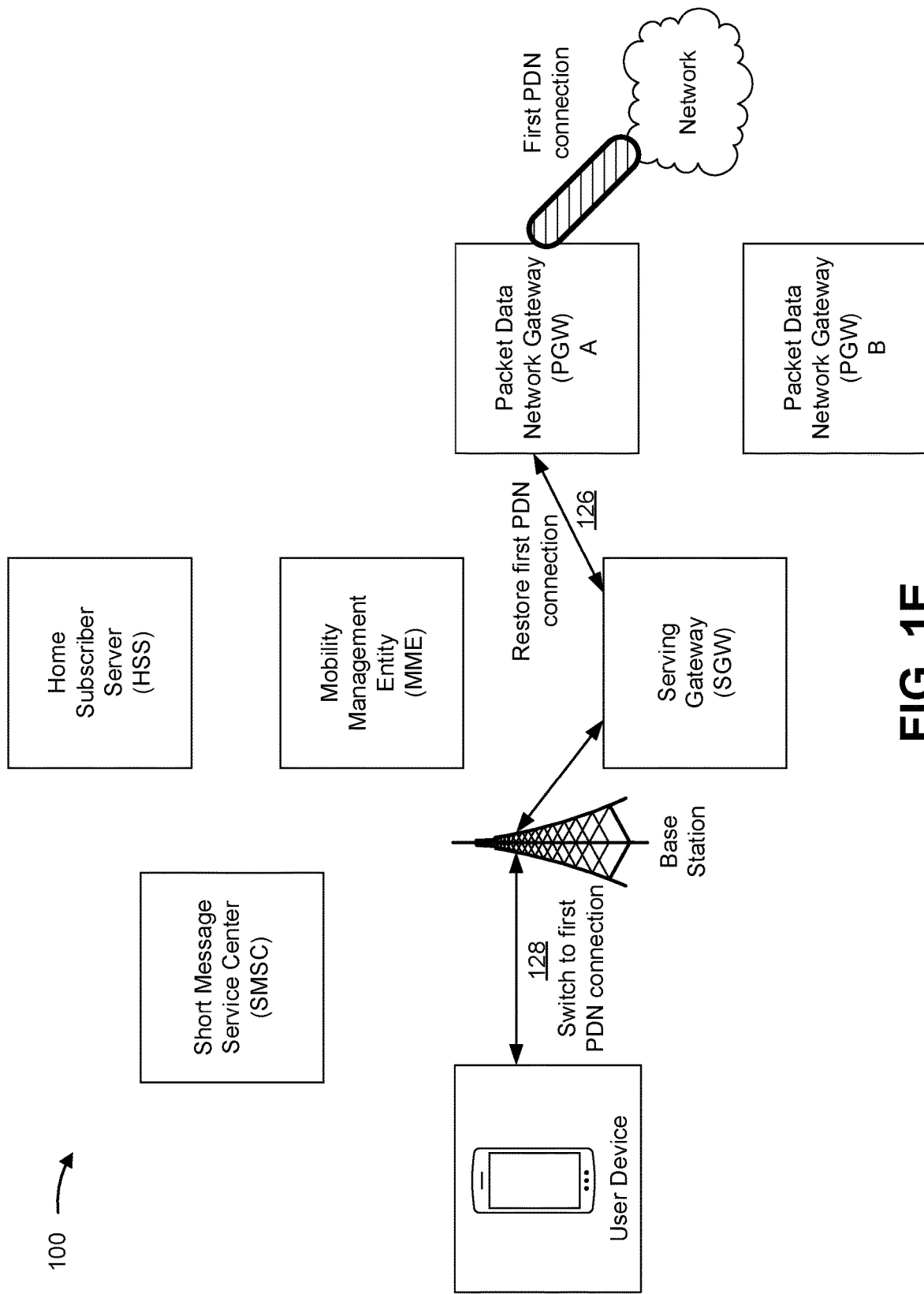

As shown in FIG. 1E and by reference number 126, the SGW can cause restoration of the connection to the first PDN after the connection to the second PDN is terminated. In some implementations, the SGW can cause the first PGW to restore the connection to the first PDN based on the information regarding the connection to the first PDN. For example, the SGW can obtain the information regarding the connection to the first PDN from the data structure and send, based on the information regarding the connection to the first PDN, a restoration signal to the first PGW (shown in FIG. 1E as PGW A) via the first bearer to reestablish the connection to the first PDN. The first PGW can reestablish, based on the restoration signal, the connection to the first PDN. As shown by reference number 128, the SGW can send a notification to the user device, via the base station, that indicates that the first PDN connection is reestablished and/or that the user device should communicate via the first PDN connection. In some implementations, the user device can switch to the first PDN connection to communicate data with the data network via the core network.

Figure 1F:
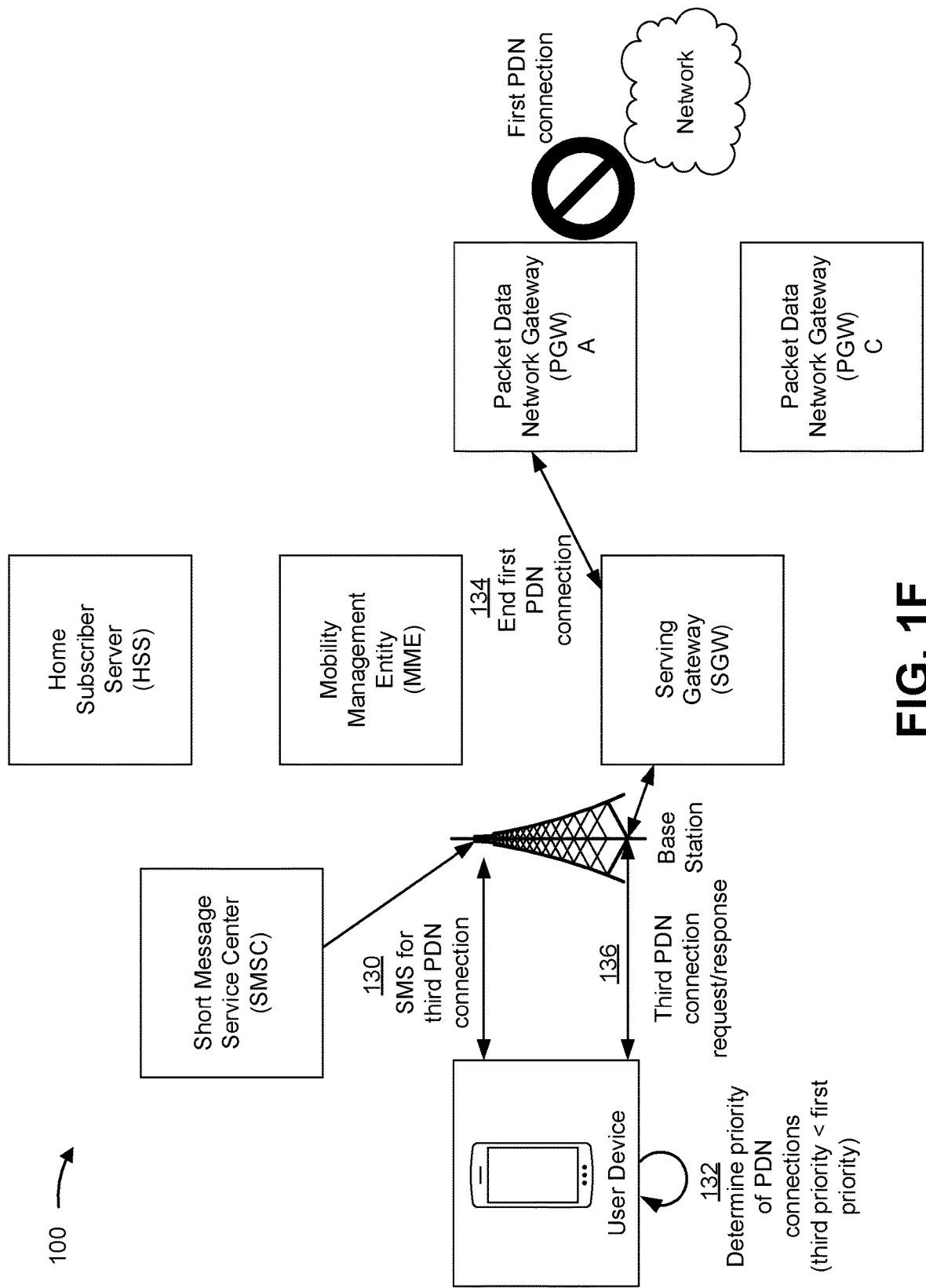

As shown in FIG. 1F and by reference number 130, the SMSC can send, to the user device and via the base station, a second SMS to initiate a connection to a third PDN. For example, the SMSC can send a second SMS that indicates that the user device needs to connect to an IMS PDN for the user device to communicate voice traffic. Additionally and/or alternatively, in some implementations, the user device can run one or more internal processes, such as an application, a web browser, an update request, a MO call, and/or the like, that indicates to the user device, such as via a message, that the user device needs to connect to the third PDN.

As shown by reference number 132, the user device can determine, based on the PDN priority list, the priority of the third PDN. In some implementations, the user device can determine the respective priority of each PDN of the plurality of PDNs in the PDN priority list. In some implementations, the user device can determine, based on the priority list, that the priority of the third PDN is lower than the priority of the first PDN. For example, where the first PDN is PDN1 with a priority of 2 and the third PDN is PDN3 with a priority of 4, as shown in FIG. 1A, the user device can determine that the priority of the third PDN is lower than the priority of the first PDN (e.g., PDN3 with a priority of 4 has a lower priority than PDN1 with a priority of 2, where 1 is the highest priority in this example). In some implementations, the user device, based on determining that the priority of the third PDN is lower than the priority of the first PDN, can wait to request establishment of the third PDN connection until the first PDN connection terminates.

As shown reference number 134, the SGW can cause termination of the connection to the first PDN. In some implementations, the SGW can cause termination of the connection to the first PDN based on the time limit associated with the first PDN. For example, where the first PDN is PDN2 with a time limit of 60 seconds, as shown in FIG. 1A, the SGW can end the connection to the first PDN after the connection to the first PDN goes idle for 60 seconds. For example, the SGW, after determining that the first PDN connection has gone idle for a period of 60 seconds, can send a termination signal to the first PGW (shown in FIG. 1F as PGW A) via the first bearer to terminate the connection to the first PDN. The first PGW, based on the termination signal, can terminate the connection to the first PDN.

As shown by reference number 136, based on the second SMS and/or after waiting for the first PDN connection to terminate, the user device can send a third PDN connection request to the base station, which can send a third PDN connection response to the user device. The third PDN connection request can be a request for the SGW to create, for the user device, a connection to the third PDN. In some implementations, the third PDN connection request can identify the third PDN and can include, based on the PDN priority list, a respective priority and a respective time limit (e.g., an end time, a run time, a time limit, a run until idle time, and/or the like) for the third PDN. In some implementations, the user device can send the third PDN connection request to the SGW via the base station. In some implementations, the SGW can obtain (e.g., receive, fetch, and/or the like) the third PDN connection request from the user device via the base station.

Figure 1G:
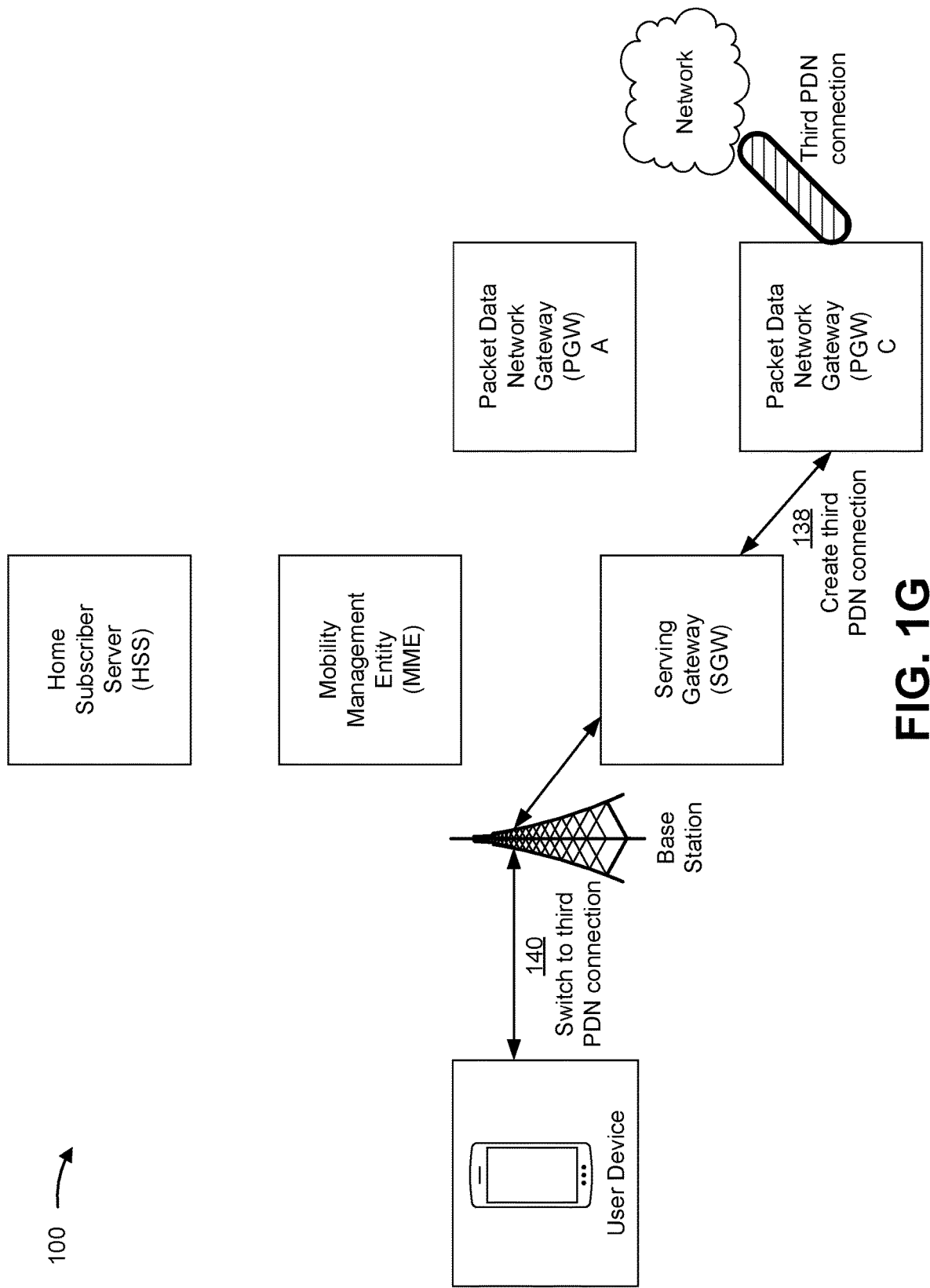

As shown in FIG. 1G and by reference number 138, the SGW can cause, based on the third PDN connection request and after the connection to the first PDN is terminated, establishment of the connection to the third PDN. In some implementations, the SGW can cause a third PGW (shown in FIG. 1G as PGW C) to establish the connection to the third PDN. For example, the SGW, based on third PDN connection request, can establish a third bearer with the third PGW and send a third instruction signal to the third PGW via the third bearer to establish the connection to the third PDN. The third PGW, based on the third instruction signal, can establish the connection to the third PDN. As shown by reference number 140, the SGW can send a notification to the user device, via the base station, that indicates that the third PDN connection is established and/or that the user device should communicate via the third PDN connection. In some implementations, the user device can switch to the third PDN connection to communicate data with the data network via the core network.

Figure 1H:
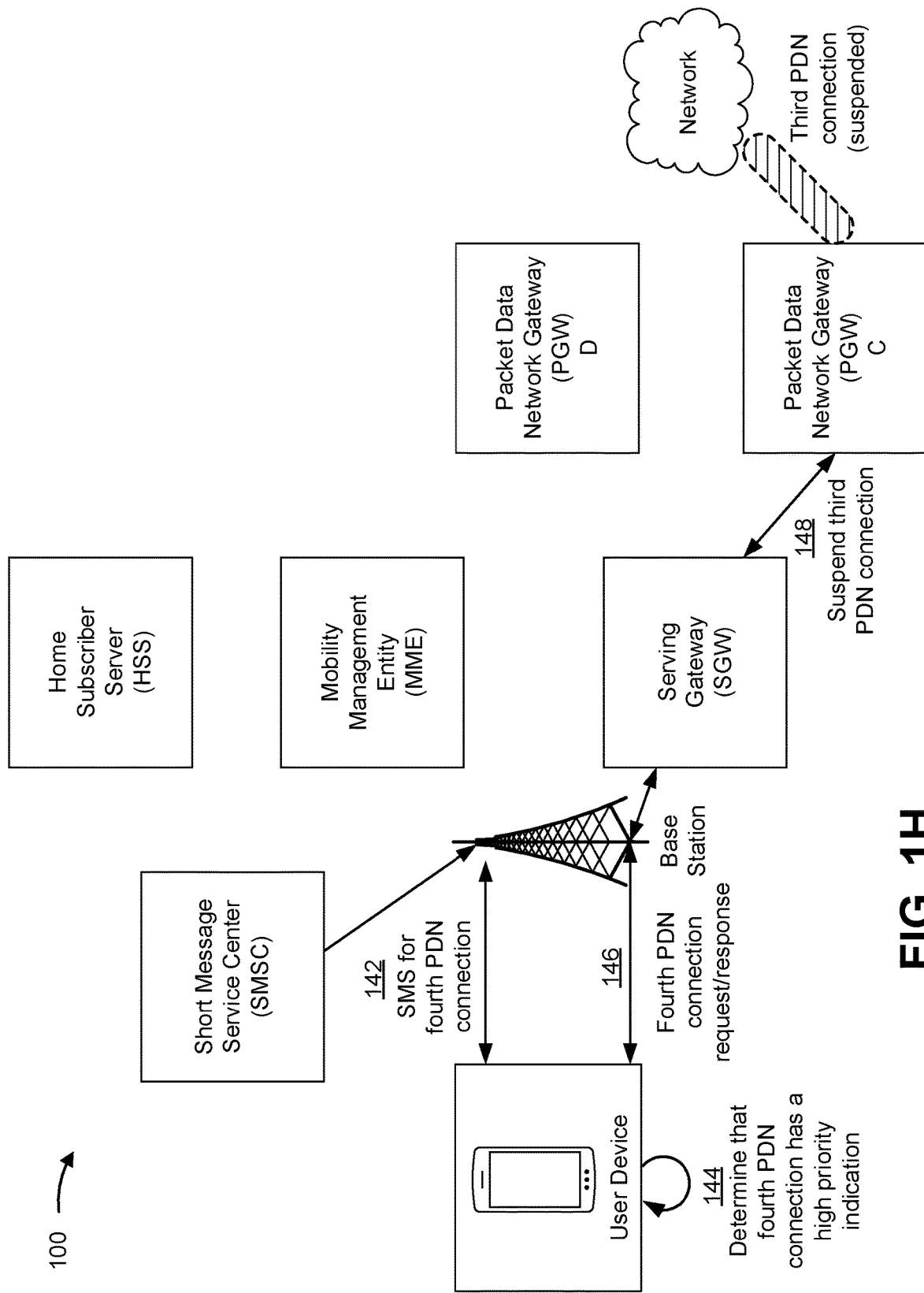

As shown in FIG. 1H and by reference number 142, the SMSC can send, to the user device and via the base station, a third SMS to initiate a connection to a fourth PDN in a similar manner as described herein in relation to FIG. 1B. For example, the SMSC can send a third SMS that indicates that the user device needs to connect to an internet PDN in order for the user device to communicate internet traffic. Additionally and/or alternatively, in some implementations, the user device can run one or more internal processes, such as an application, a web browser, an update request, a MO call, and/or the like, that indicates to the user device, such as via a message, that the user device needs to connect to the fourth PDN. In some implementations, the third SMS can include a high priority indication, which means that the user device needs to connect to the fourth PDN, regardless of which PDN the user device is currently connected to. As shown by reference number 144, the user device, based on the third SMS, can determine that the fourth PDN has the high priority indication. For example, where the third PDN is PDN0 with a priority of 1 and a time limit of $\infty$, as shown in FIG. 1A, and the fourth PDN is PDN X and the fourth PDN connection request indicates that fourth PDN has a high priority, the user device can determine that the priority of the fourth PDN is higher than the priority of the third PDN, even though the time limit of the third PDN indicates that the SGW will not automatically end the connection to the third PDN.

As shown by reference number 146, the user device can send a fourth PDN connection request to the SGW via the base station in a similar manner as described herein in relation to FIG. 1B. In some implementations, the fourth PDN connection request can identify the fourth PDN and can include information that the fourth PDN has the high priority indication. As shown by reference number 148, the SGW can cause, based on the fourth PDN connection request, suspension of the connection to the third PDN in a similar manner as described herein in relation to FIG. 1B.

Figure 1I:
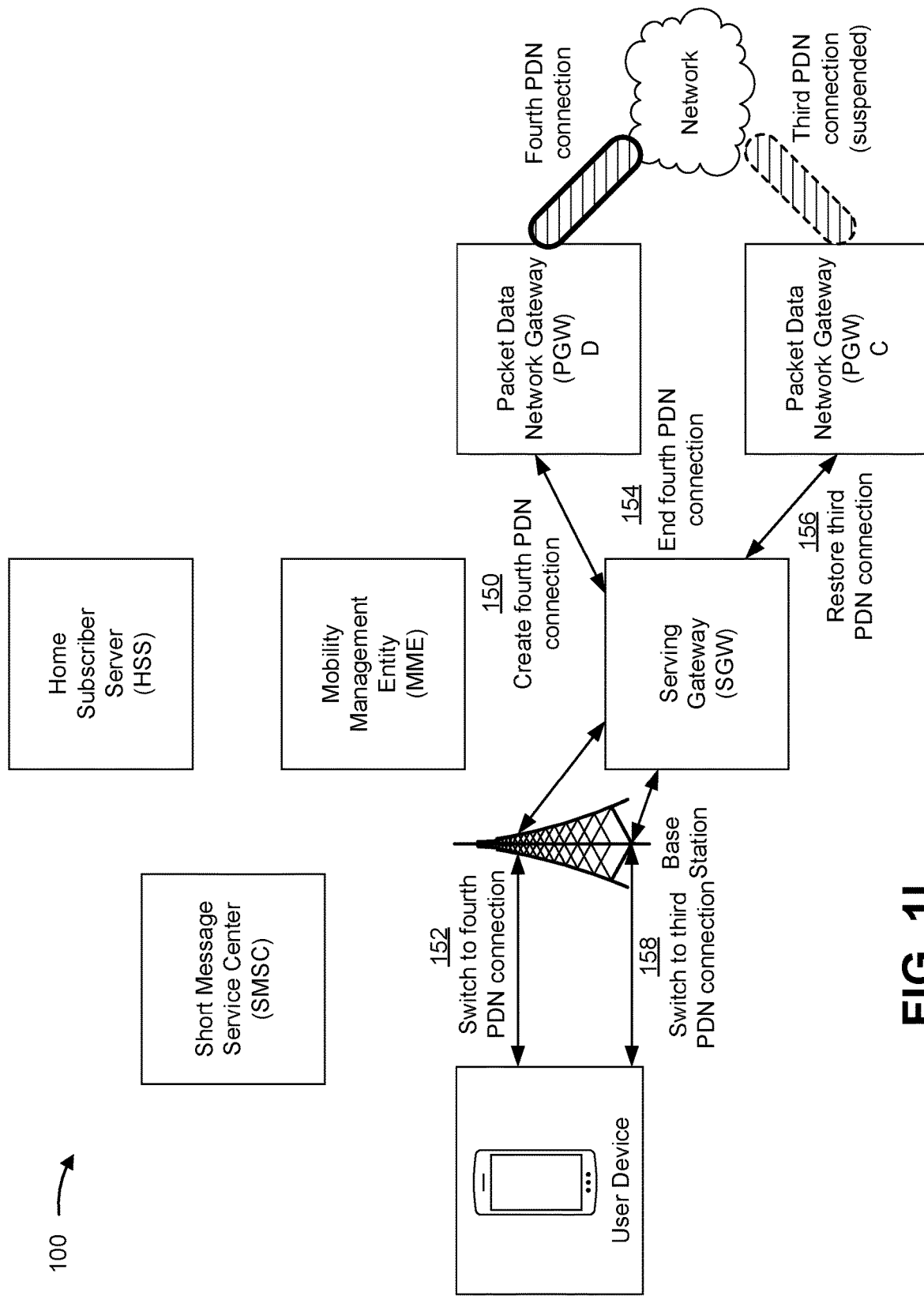

As shown in FIG. 1I and by reference number 150, the SGW can cause, based on the fourth PDN connection request and after causing suspension of the connection to the third PDN, establishment of the connection to the fourth PDN in a similar manner as described herein in relation to FIG. 1C. As shown by reference number 152, the SGW can send a notification to the user device, via the base station, that indicates that the fourth PDN connection is established and/or that the user device should communicate via the fourth PDN connection in a similar manner as described herein in relation to FIG. 1C. As shown by reference number 154, the SGW can cause termination of the connection to the fourth PDN in a similar manner as described herein in relation to FIG. 1D. As shown by reference number 156, the SGW can cause restoration of the connection to the third PDN after the connection to the fourth PDN is terminated in a similar manner as described herein in relation to FIG. 1E. As shown by reference number 158, the SGW can send a notification to the user device, via the base station, that indicates that the third PDN connection is reestablished and/or that the user device should communicate via the third PDN connection in a similar manner as described herein in relation to FIG. 1E.

As indicated above, FIGS. 1A-1I are provided merely as an example. Other examples can differ from what was described with regards to FIGS. 1A-1I.

Figure 2:
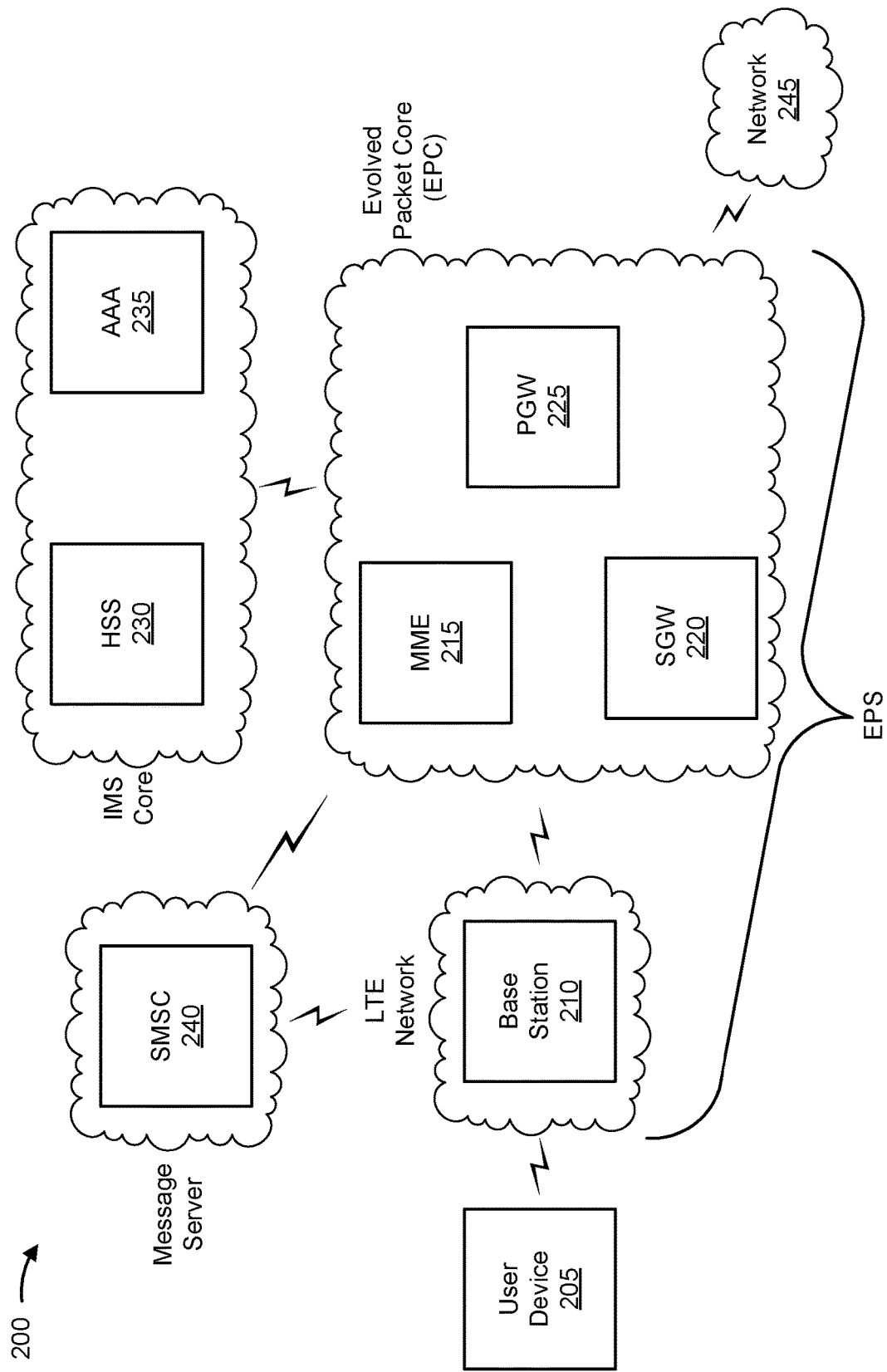
FIG. 2 is a diagram of an example environment in which systems and/or methods described herein can be implemented.

FIG. 2 is a diagram of an example environment 200 in which systems and/or methods, described herein, can be implemented. As shown in FIG. 2, environment 200 can include a user device 205; a base station 210; a mobility management entity device (MME) 215; a serving gateway (SGW) 220; a packet data network gateway (PGW) 225; a home subscriber server (HSS) 230; an authentication, authorization, and accounting server (AAA) 235; a Short Message Service Center (SMSC) 240; and/or a network 245. Devices of environment 200 can interconnect via direct wired/fiber connections, wireless connections, or a combination of direct wired/fiber and wireless connections.

Some implementations are described herein as being performed within a long term evolution (LTE) network for explanatory purposes. Some implementations can be performed within a network that is not an LTE network, such as a 3G network or a 5G network. With a 5G network, one or more of the devices and/or functions described herein can be virtualized and performed within a cloud computing environment and/or by one or more devices different than those described herein.

Environment 200 can include an evolved packet system (EPS) that includes an LTE network and/or an evolved packet core (EPC) that operate based on a third generation partnership project (3GPP) wireless communication standard. The LTE network can include a radio access network (RAN) that includes one or more base stations 210 (e.g., cells) that take the form of evolved Node Bs (eNBs) via which user device 205 communicates with the EPC. The EPC can include MME 215, SGW 220, and/or PGW 225 that enable user device 205 to communicate with network 245 (e.g., via a packet data network (PDN) connection) and/or an Internet protocol (IP) multimedia subsystem (IMS) core. The IMS core can include HSS 230 and/or AAA 235, and can manage device registration and authentication, session initiation, etc., associated with user devices 205. HSS 230 and/or AAA 235 can reside in the EPC and/or the IMS core. HSS 230 can determine and/or generate a PDN priority list, which MME 215 can use to cause SGW 220 and/or PGW 225 to establish, suspend, and/or terminate a connection to a PDN.

User device 205 can include one or more devices capable of communicating with base station 210 and/or a network (e.g., network 245). For example, user device 205 can include a wireless communication device, a radiotelephone, a personal communications system (PCS) terminal (e.g., that can combine a cellular radiotelephone with data processing and data communications capabilities), a smart phone, a wearable computing device, a laptop computer, a tablet computer, a personal gaming system, an Internet of Things (IoT) device (e.g., a narrow-band IoT (NB-IoT) device), and/or a similar device. User device 205 can send traffic to and/or receive traffic from network 245 (e.g., via base station 210, SGW 220, PGW 225, and/or a connection to a PDN). In some implementations, user device 205 can send, to MME 215 (e.g., via base station 210), a request to create a connection to a PDN; can receive an SMS for a PDN connection from SMSC 240 (e.g., via base station 210), and/or the like.

Base station 210 (e.g., also referred to as a cell, or cell site) can include one or more devices capable of transferring traffic, such as audio, video, text, and/or other traffic, destined for and/or received from user device 205. In some implementations, base station 210 can include an eNB associated with the LTE network that receives traffic from and/or sends traffic to network 245 via SGW 220 and/or PGW 225. Additionally, or alternatively, one or more base stations 210 can be associated with a RAN that is not associated with the LTE network. Base station 210 can send traffic to and/or receive traffic from user device 205 via an air interface. In some implementations, base station 210 can include a small cell base station, such as a base station of a microcell, a picocell, and/or a femtocell. In some implementations, base station 210 can be associated with a 4G LTE cell, a 5G NR cell, a 5G NR sub-6 GHz cell, a 5G NR mmWave cell, or the like.

MME 215 can include one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular SGW 220 and/or a particular PGW 225 to serve traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215). In some implementations, MME 215 can receive a connection request from user device 205 (e.g., via base station 210), can send a message to SGW 220 to create, suspend, restore, and/or terminate a PDN connection, and/or the like.

SGW 220 can include one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 245 (e.g., via PGW 225) and/or other network devices associated with the EPC and/or the IMS core. SGW 220 can also receive traffic from network 245 and/or other network devices, and can send the received traffic to user device 205 via base station 210. Additionally, or alternatively, SGW 220 can perform operations associated with handing off user device 205 to and/or from an LTE network. In some implementations, SGW 220 can send a signal to a PGW 225 to create, suspend, restore, and/or terminate a PDN connection.

PGW 225 can include one or more devices capable of providing connectivity for user device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 245. Additionally, or alternatively, PGW 225 can receive traffic from network 245, and can send the traffic to user device 205 via SGW 220 and base station 210. PGW 225 can record data usage information (e.g., byte usage), and can provide the data usage information to AAA 235. In some implementations, the PGW 225 can create, suspend, restore, and/or terminate a PDN connection.

HSS 230 can include one or more devices, such as one or more server devices, capable of managing (e.g., receiving, generating, storing, processing, and/or providing) information associated with user device 205. For example, HSS 230 can manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 230 can provide this information to one or more other devices of environment 200 to support the operations performed by those devices. In some implementations, HSS 230 can generate, determine, and/or maintain a PDN priority list, and can provide the PDN priority list to MME 215.

AAA 235 can include one or more devices, such as one or more server devices, that perform authentication, authorization, and/or accounting operations for communication sessions associated with user device 205. For example, AAA 235 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, etc.), can track resources consumed by user device 205 (e.g., a quantity of voice minutes consumed, a quantity of data consumed, etc.), and/or can perform similar operations.

SMSC 240 can include one or more devices capable of handling short message service (SMS) operations, such as reception, storage, forwarding, delivery and/or maintenance of SMS messages. For example, SMSC 240 can include a server device or a group of server devices (e.g., associated with a multi-server micro data center), a workstation computer or a group of workstation computers, a virtual machine (VM) or a group of virtual machines (VMs) implemented by one or more computing devices provided in a cloud computing environment, or a similar type or group of devices. In some implementations, SMSC 240 can send, to user device 205 (e.g., via base station 210) an SMS message to initiate a connection to a PDN.

Network 245 can include one or more wired and/or wireless networks. For example, network 245 can include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3A:
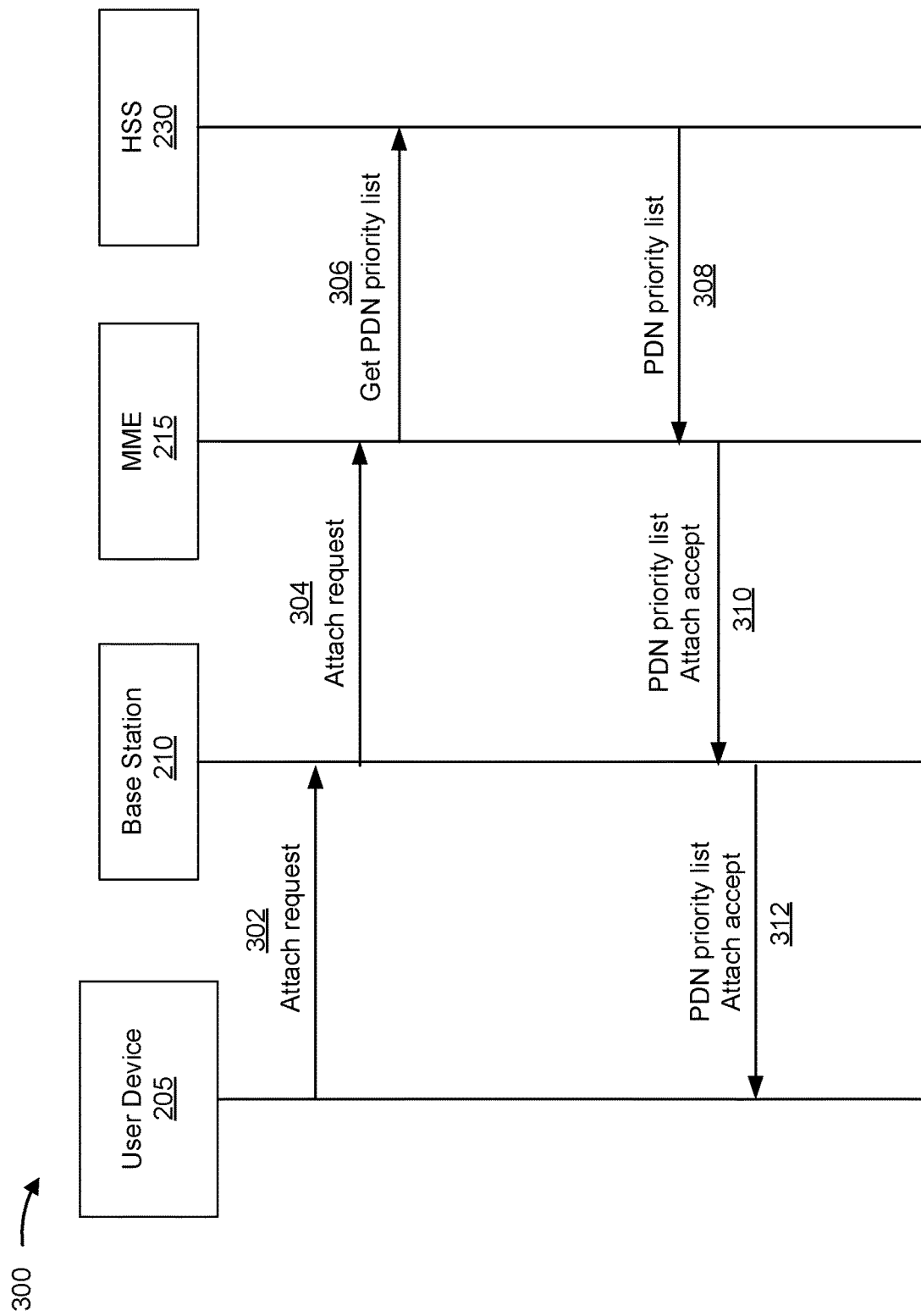
FIGS. 3A-3B are diagrams of a call flow of example operations capable of being performed by one or more devices of FIG. 2 and/or one or more components of one or more devices of FIG. 2.
Figure 3B:
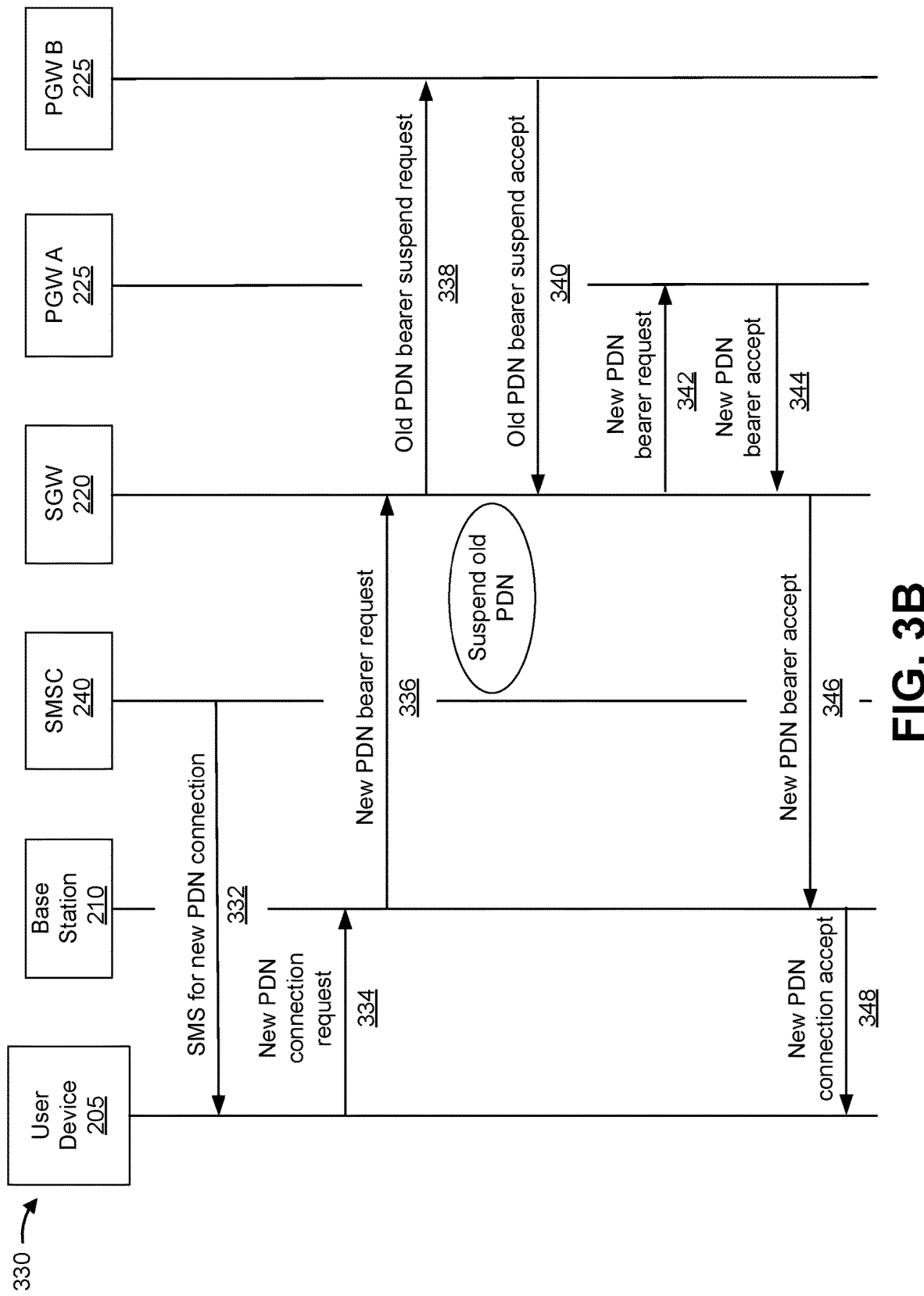

FIGS. 3A-3B are diagrams of example call flows of example operations capable of being performed by one or more devices of FIG. 2 and/or one or more components of one or more devices of FIG. 2. For example, FIG. 3A is a diagram of an example call flow 300 for user device to establish a connection to a packet data network (PDN) and for a home subscriber server (HSS) to deliver a PDN priority list to a mobility management entity (MME) and/or the user device. As another example, FIG. 3B is a diagram of an example call flow 330 for a serving gateway (SGW), a first packet data network gateway (PGW), and a second PGW, to suspend a current PDN connection and establish new PDN connection based on a Short Message Service Center (SMSC) sending a short message service (SMS) message to the user device to initiate the new PDN connection.

As shown in FIG. 3A, a user device 205 can establish a connection to a PDN and the user device 205 and/or the MME 215 can obtain (e.g., receive, fetch, and/or the like) the PDN priority list from the HSS 230 in a similar manner as described herein in relation to FIG. 1A. As shown by reference number 302, the user device 205 can send an attach request (e.g., a request for a connection to a PDN) to the base station 210, which can send the attach request, as shown by reference number 304, to the MME 215. Based on the attach request, the MME 215 can send, as shown by reference number 306, a get PDN priority list signal to the HSS 230. Based on the get PDN priority list signal, the HSS 230 can send, as shown by reference number 308, the PDN priority list to the MME 215. The MME 215 can cause establishment of the connection to the PDN, based on the attach request and/or the PDN priority list, and send, as shown by reference number 310, the PDN priority list and an attach accept signal (e.g., a signal indicating that the connection to the PDN has been established) to the base station 210, which can send the PDN priority list and the attach accept signal, as shown by reference number 312, to the user device 205.

As shown in FIG. 3B, the user device 205 can cause suspension of an old connection to a particular PDN and cause establishment of a new connection to a higher priority PDN in a similar manner as described herein in relation to FIGS. 1B and 1C. As shown by reference number 332, the SMSC 240 can send an SMS to the user device 205 indicating that the user device 205 needs to connect to the higher priority PDN. As shown by reference number 334, the user device can send, based on the SMS, a new PDN connection request to the base station 210. Based on the new PDN connection request, the base station 210 can send, as shown by reference number 336, a new PDN bearer request to the SGW 220, which can send, as shown in reference number 338, an old PDN bearer suspend request to a second PGW 225 (shown as PGW B). Based on the old PDN bearer suspend request, the second PGW 225 can suspend the old connection to the PDN and send, as shown by reference number 340, an old PDN bearer suspend accept signal to the SGW 220. Based on the old PDN bearer suspend accept signal, the SGW 220 can send, as shown by reference number 342, a new PDN bearer request to the first PGW 225 (shown as PGW A). Based on the new PDN bearer request, the first PGW 225 can establish a new connection to the high priority PDN and send, as shown by reference number 344, a new PDN bearer accept signal to the SGW 220. The SGW 220 can send, as shown by reference number 346, the new PDN bearer accept signal to the base station 210, which can send, as shown by reference number 348, a new PDN connection accept signal to the user device 205.

As indicated above, FIGS. 3A-3B are provided merely as an example. Other examples can differ from what was described with regard to FIGS. 3A-3B.

Figure 4:
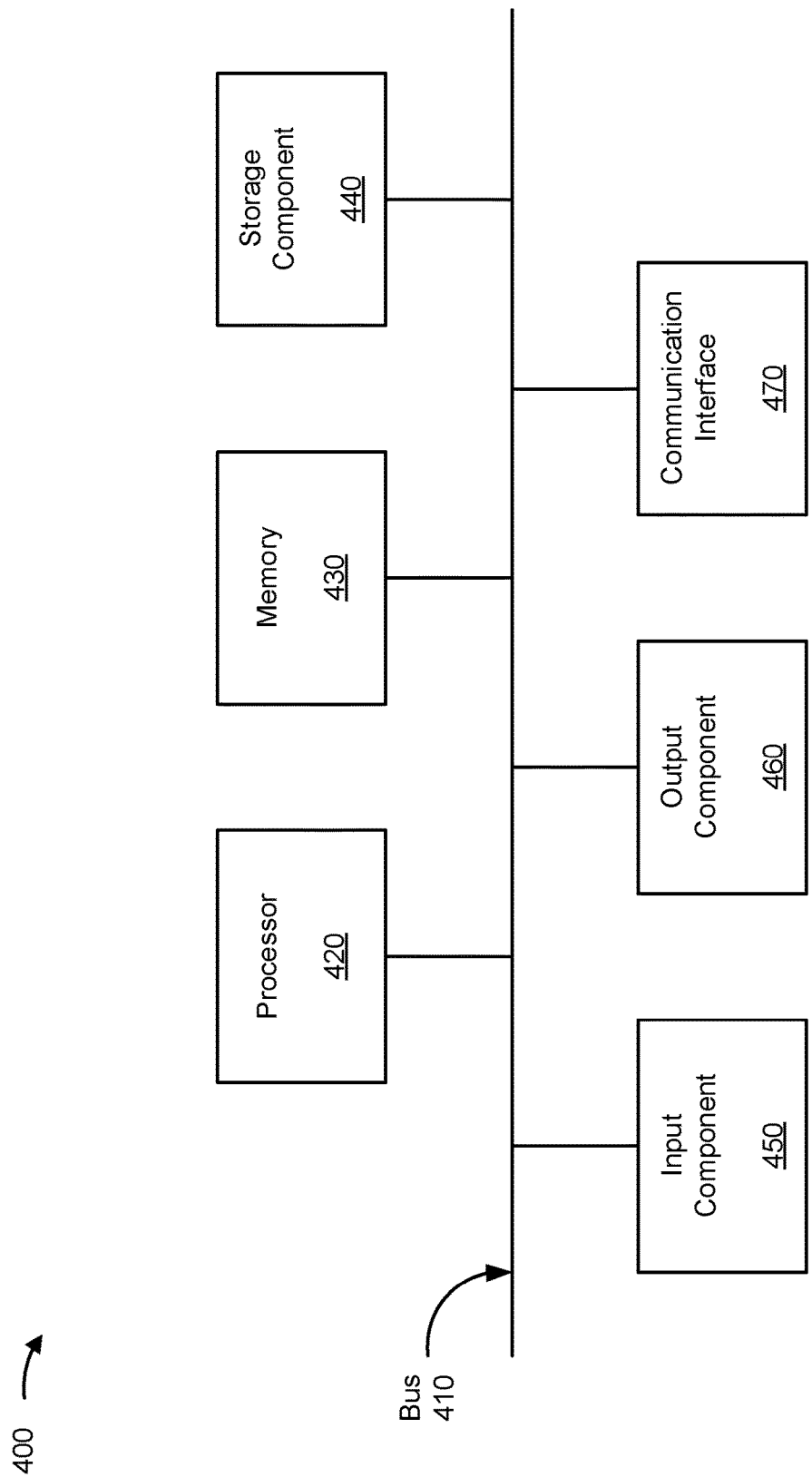
FIG. 4 is a diagram of example components of one or more devices of FIG. 2.

FIG. 4 is a diagram of example components of a device 400. Device 400 can correspond to a user device 205, a base station 210, an MME 215, a SGW 220, a PGW 225, an HSS 230, AAA 235, and/or SMSC 240. In some implementations, user device 205, a base station 210, an MME 215, a SGW 220, a PGW 225, an HSS 230, an AAA 235, and/or an SMSC 240 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
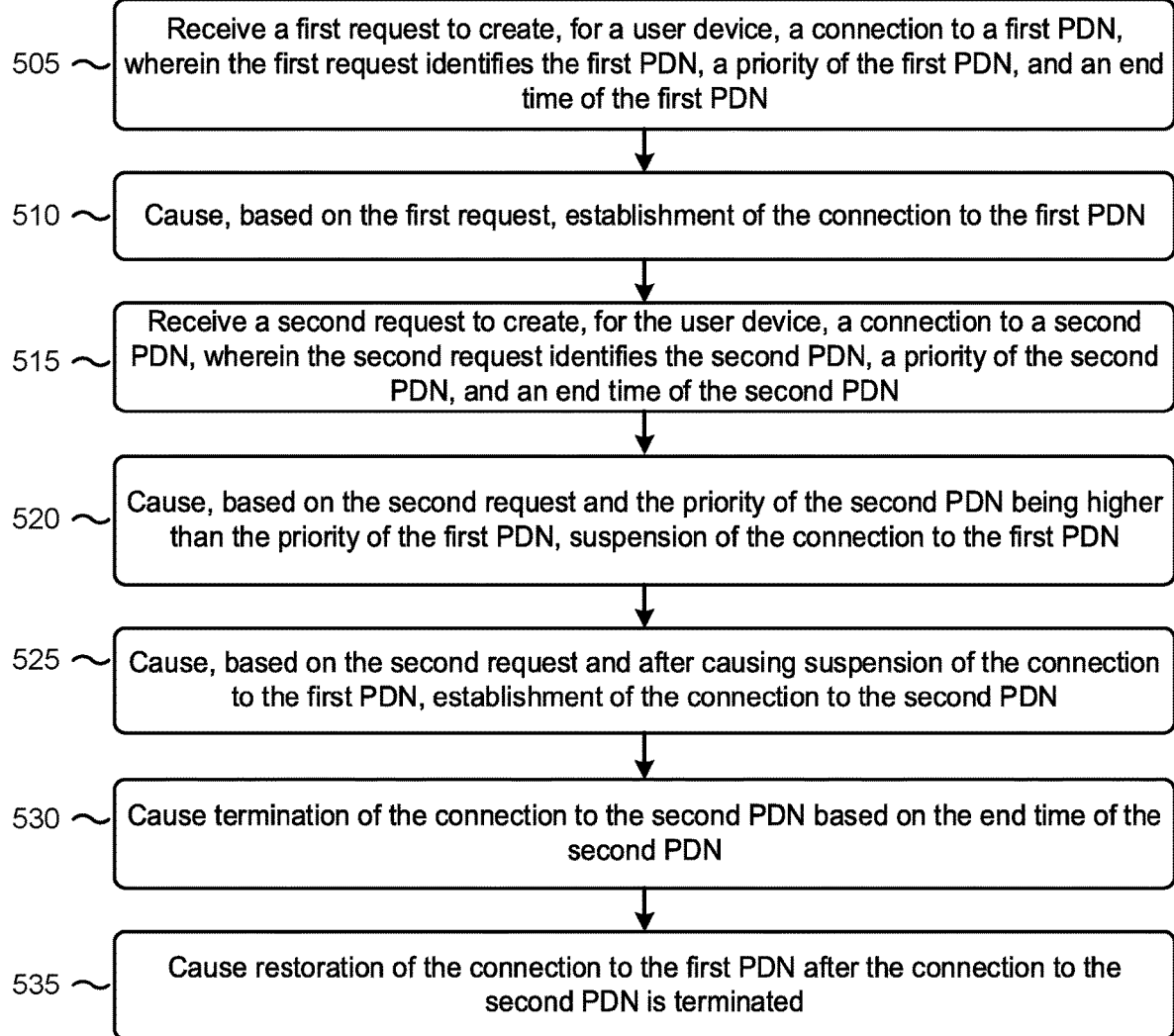
FIG. 5 is a flow chart of an example process for connecting to a packet data network (PDN) based on priority.

FIG. 5 is a flow chart of an example process 500 for connecting to a packet data network (PDN) based on priority. In some implementations, one or more process blocks of FIG. 5 can be performed by a serving gateway device (e.g., SGW 220). In some implementations, one or more process blocks of FIG. 5 can be performed by another device or a group of devices separate from or including the serving gateway device, such as a user device (e.g., user device 205), a base station (e.g., base station 210), a mobility management entity device (e.g., MME 215), a packet data network gateway (e.g., PGW 225), a home subscriber server (e.g., HSS 230), an authentication, authorization, and accounting server (e.g., AAA 235), a Short Message Service Center (e.g., SMSC 240), and/or the like.

As shown in FIG. 5, process 500 can include receiving a first request to create, for a user device, a connection to a first PDN, wherein the first request identifies the first PDN, a priority of the first PDN, and an end time of the first PDN (block 505). For example, the serving gateway device (e.g., using processor 420, memory 430, storage component 440, input component 450, communication interface 470, and/or the like) can receive a first request to create, for a user device, a connection to a first PDN, as described above in connection with FIGS. 1A-1I. In some implementations, the first request identifies the first PDN, a priority of the first PDN, and/or an end time of the first PDN As further shown in FIG. 5, process 500 can include causing, based on the first request, establishment of the connection to the first PDN (block 510). For example, the serving gateway device (e.g., using processor 420, memory 430, storage component 440, output component 460, communication interface 470, and/or the like) can cause, based on the first request, establishment of the connection to the first PDN, as described above in connection with FIGS. 1A-1I.

As further shown in FIG. 5, process 500 can include receiving a second request to create, for the user device, a connection to a second PDN, wherein the second request identifies the second PDN, a priority of the second PDN, and an end time of the second PDN (block 515). For example, the serving gateway device (e.g., using processor 420, memory 430, storage component 440, input component 450, communication interface 470, and/or the like) can receive a second request to create, for the user device, a connection to a second PDN, as described above in connection with FIGS. 1A-1I. In some implementations, the second request identifies the second PDN, a priority of the second PDN, and/or an end time of the second PDN.

As further shown in FIG. 5, process 500 can include causing, based on the second request and the priority of the second PDN being higher than the priority of the first PDN, suspension of the connection to the first PDN (block 520). For example, the serving gateway device (e.g., using processor 420, memory 430, storage component 440, output component 460, and/or the like) can cause, based on the second request and the priority of the second PDN being higher than the priority of the first PDN, suspension of the connection to the first PDN, as described above in connection with FIGS. 1A-1I.

As further shown in FIG. 5, process 500 can include causing, based on the second request and after causing suspension of the connection to the first PDN, establishment of the connection to the second PDN (block 525). For example, the serving gateway device (e.g., using processor 420, memory 430, storage component 440, output component 460, communication interface 470, and/or the like) can cause, based on the second request and after causing suspension of the connection to the first PDN, establishment of the connection to the second PDN, as described above in connection with FIGS. 1A-1I.

As further shown in FIG. 5, process 500 can include causing termination of the connection to the second PDN based on the end time of the second PDN (block 530). For example, the serving gateway device (e.g., using processor 420, memory 430, storage component 440, output component 460, communication interface 470, and/or the like) can cause termination of the connection to the second PDN based on the end time of the second PDN, as described above in connection with FIGS. 1A-1I.

As further shown in FIG. 5, process 500 can include causing restoration of the connection to the first PDN after the connection to the second PDN is terminated (block 535). For example, the serving gateway device (e.g., using processor 420, memory 430, storage component 440, output component 460, communication interface 470, and/or the like) can cause restoration of the connection to the first PDN after the connection to the second PDN is terminated, as described above in connection with FIGS. 1A-1I.

Process 500 can include additional implementations, such as any single implementation or any combination of implementations described below and/or in connection with one or more other processes described elsewhere herein.

In some implementations, when causing establishment of the connection to the first PDN, the serving gateway device can cause a first packet data network gateway (PGW) to establish the connection to the first PDN, and, when causing establishment of the connection to the second PDN, can cause a second PGW to establish the connection to the second PDN. In some implementations, the end time of the second PDN can indicate an amount of time to wait to end the connection to the second PDN after the connection to the second PDN goes idle.

In some implementations, when causing establishment of the connection to the first PDN, the serving gateway device can establish a first bearer with a first packet data network gateway (PGW), and send a first instruction signal to the first PGW via the first bearer to establish the connection to the first PDN. Additionally, when causing establishment of the connection to the second PDN, the serving gateway device can establish a second bearer with a second PGW, and send a second instruction signal to the second PGW via the second bearer to establish the connection to the second PDN.

In some implementations, when causing the suspension of the connection to the first PDN, the serving gateway device can store information regarding the connection to the first PDN in a data structure. Additionally, when causing restoration of the connection to the first PDN after the connection to the second PDN is terminated, the serving gateway device can obtain the information regarding the connection to the first PDN from the data structure, and cause a packet data network gateway (PGW) to restore the connection to the first PDN based on the information regarding the connection to the first PDN.

In some implementations, the serving gateway device can cause termination of the connection to the first PDN based on the end time of the first PDN, can receive a third request to create, for the user device, a connection to a third PDN, and can cause, based on the third request and after the connection to the first PDN is terminated, establishment of the connection to the third PDN.

In some implementations, the connection to the first PDN can be configured to carry IP Multimedia Subsystem (IMS) traffic, the connection to the second PDN can be configured to carry network administration traffic, and the connection to the third PDN can be configured to carry internet traffic.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term component is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
accessing, by a user device, a list that identifies a plurality of packet data networks (PDNs) and a respective priority associated with each PDN of the plurality of PDNs;
sending, by the user device and to a base station, a first PDN connection request to create, for the user device, a connection to a first PDN,
wherein the first PDN connection request identifies a priority of the first PDN based on the list;
receiving, by the user device, a first notification that the connection to the first PDN is established;
receiving, by the user device, a message to initiate a connection to a second PDN;
determining, by the user device and based on the PDN list, that a priority of the second PDN is higher than the priority of the first PDN based on a comparison of the priority of the second PDN and the priority of the first PDN; and
sending, by the user device, to the base station, and based on determining that the priority of the second PDN is higher than the priority of the first PDN, a second PDN connection request to create, for the user device, a connection to the second PDN.

2. The method of claim 1, further comprising:
receiving a second message to initiate a connection to a third PDN;
determining, based on the list, that a priority of the third PDN is lower than the priority of the second PDN; and
waiting, based on the determination that the priority of the third PDN is lower than the priority of the first PDN and the second PDN, to request establishment of the connection to the third PDN until the connection to the second PDN terminates.

3. The method of claim 1, further comprising:
receiving a second notification that the connection to the second PDN is established; and
switching to the connection to the second PDN to communicate data.

4. The method of claim 1, further comprising:
receiving a second message to initiate a connection to a third PDN that includes a high priority indication,
determining, based on the high priority indication, that the priority of the third PDN is higher than any other PDN, and
sending, based on the high priority indication, a third PDN connection request to create, for the user device, a connection to the third PDN.

5. The method of claim 1, wherein the message is received from a short message service center (SMSC), and
wherein the message is a short message service (SMS) message.

6. The method of claim 1, wherein the list additionally identifies a respective time limit associated with each PDN,
wherein the second PDN connection request identifies the respective time limit associated with the second PDN,
wherein the connection to the second PDN is set to terminate based on the respective time limit, and
wherein the termination of the connection to the second PDN causes a restoration of the connection to the first PDN.

7. The method of claim 6, wherein the respective time limit associated with the each PDN identifies one or more of:
an end time,
a run time,
a time limit, or
a run until idle time.

8. A non-transitory computer-readable medium storing a set of instructions, the set of instructions comprising:
one or more instructions that, when executed by one or more processors of a device, cause the device to:
access a list that identifies a plurality of packet data networks (PDNs) and a respective priority associated with each PDN of the plurality of PDNs;
send, to a base station, a first PDN connection request to create, for the device, a connection to a first PDN,
wherein the first PDN connection request identifies a priority of the first PDN based on the list;
receive a first notification that the connection to the first PDN is established;
receive a message to initiate a connection to a second PDN;
determine, based on the list, that a priority of the second PDN is higher than the priority of the first PDN based on a comparison of the priority of the second PDN and the priority of the first PDN; and
send, to the base station and based on determining that the priority of the second PDN is higher than the priority of the first PDN, a second PDN connection request to create, for the device, a connection to the second PDN.

9. The non-transitory computer-readable medium of claim 8, wherein the one or more instructions further cause the device to:
receive a second message to initiate a connection to a third PDN;
determine, based on the list, that a priority of the third PDN is lower than the priority of the second PDN; and
wait, based on the determination that the priority of the third PDN is lower than the priority of the first PDN and the second PDN, to request establishment of the connection to the third PDN until the connection to the second PDN terminates.

10. The non-transitory computer-readable medium of claim 8, wherein the one or more instructions further cause the device to:
receive a second notification that the connection to the second PDN is established; and
switch to the connection to the second PDN to communicate data.

11. The non-transitory computer-readable medium of claim 8, wherein the one or more instructions further cause the device to:
  receive a second message to initiate a connection to a third PDN that includes a high priority indication,
  determine, based on the high priority indication, that the priority of the third PDN is higher than any other PDN, and
  send, based on the high priority indication, a third PDN connection request to create, for the device, a connection to the third PDN.

12. The non-transitory computer-readable medium of claim 8, wherein the message is received from a short message service center (SMSC), and
  wherein the message is a short message service (SMS) message.

13. The non-transitory computer-readable medium of claim 8, wherein the list additionally identifies a respective time limit associated with each PDN,
  wherein the second PDN connection request identifies the respective time limit associated with the second PDN,
  wherein the connection to the second PDN is set to terminate based on the respective time limit, and
  wherein the termination of the connection to the second PDN causes a restoration of the connection to the first PDN.

14. The non-transitory computer-readable medium of claim 13, wherein the respective time limit associated with the each PDN identifies one or more of:
  an end time,
  a run time,
  a time limit, or
  a run until idle time.

15. A device, comprising:
  one or more processors configured to:
    access a list that identifies a plurality of packet data networks (PDNs) and a respective priority associated with each PDN of the plurality of PDNs;
    send, to a base station, a first PDN connection request to create, for the device, a connection to a first PDN, wherein the first PDN connection request identifies a priority of the first PDN based on the list;
    receive a first notification that the connection to the first PDN is established;
    receive a message to initiate a connection to a second PDN;
    determine, based on the list, that a priority of the second PDN is higher than the priority of the first PDN based on a comparison of the priority of the second PDN and the priority of the first PDN; and
    send, to the base station and based on determining that the priority of the second PDN is higher than the priority of the first PDN, a second PDN connection request to create, for the device, a connection to the second PDN.

16. The device of claim 15, wherein the one or more processors are further configured to:
  receive a second message to initiate a connection to a third PDN;
  determine, based on the list, that a priority of the third PDN is lower than the priority of the second PDN; and
  wait, based on the determination that the priority of the third PDN is lower than the priority of the first PDN and the second PDN, to request establishment of the connection to the third PDN until the connection to the second PDN terminates.

17. The device of claim 15, wherein the one or more processors are further configured to:
  receive a second notification that the connection to the second PDN is established; and
  switch to the connection to the second PDN to communicate data.

18. The device of claim 15, wherein the one or more processors are further configured to:
  receive a second message to initiate a connection to a third PDN that includes a high priority indication,
  determine, based on the high priority indication, that the priority of the third PDN is higher than any other PDN, and
  send, based on the high priority indication, a third PDN connection request to create, for the device, a connection to the third PDN.

19. The device of claim 15, wherein the message is received from a short message service center (SMSC), and
  wherein the message is a short message service (SMS) message.

20. The device of claim 15, wherein the list additionally identifies a respective time limit associated with each PDN,
  wherein the second PDN connection request identifies the respective time limit associated with the second PDN,
  wherein the connection to the second PDN is set to terminate based on the respective time limit, and
  wherein the termination of the connection to the second PDN causes a restoration of the connection to the first PDN.

* * * * *